United States Patent Office.

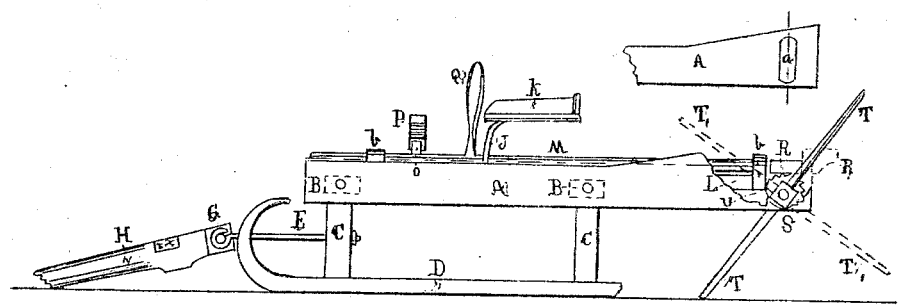
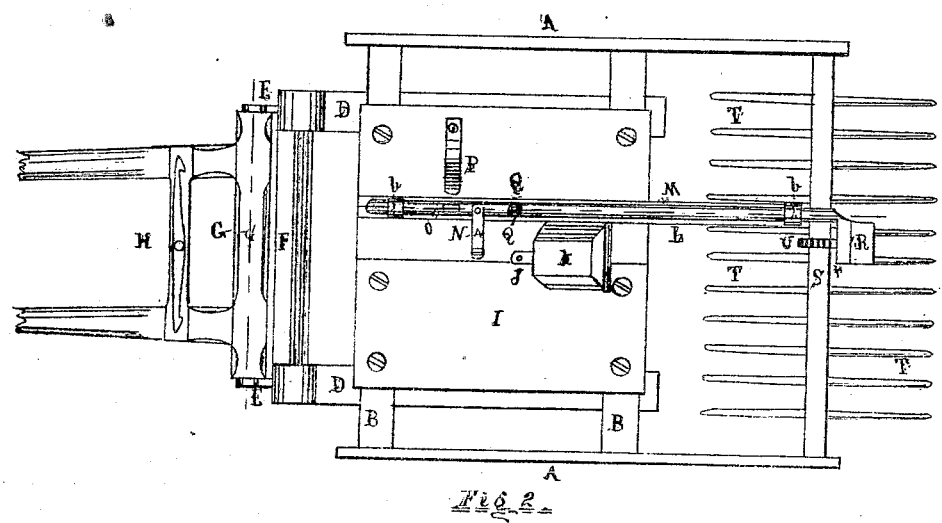

C. H. MOSEY, OF MANSFIELD, OHIO.

Letters Patent No. 92,339, dated July 6, 1869.

---

IMPROVEMENT IN HORSE-RAKES.

---

The Schedule referred to in these Letters Patent and making part of the same.

---

*To all whom it may concern:*

Be it known that I, C. H. MOSEY, of Mansfield, in the county of Richland, and State of Ohio, have invented new and useful Improvements in Horse Hay-Rakes; and I do hereby declare that the following is a full, clear, and exact description of my invention, reference being had to the accompanying drawings, forming a part of this specification, and to the letters of reference marked thereon, of which drawings—

Figure 1 is an elevation of my improved rake.

Figure 2 is a plan of the same.

The nature of my invention consists in the novel construction and arrangement of mechanism for operating a revolving hay-rake, whereby I am enabled to keep the same under perfect control of the driver, without the necessity of his leaving the seat, either for revolving the rake for discharging the load, or for turning it into position for transportation, or for revolving it into its working-position, and so accomplish these results as to require but little muscular effort on the part of the driver, thus making the rake very easy to operate, even by a boy.

To enable others skilled in the art to make and use my invention, I will proceed to describe its construction and operation.

The runners D D are formed of wood, cut or bent into the form shown, and are from three to five inches, or more, in width.

In them are secured the uprights C C, the upper ends of which are secured in the cross-pieces B B, which extend out beyond the runners D D, and have the rake-standards A A secured at their ends.

The cross-piece F, unites the fronts of the runners D D; and the draught-irons E E are passed through the fronts of said runners, and the first uprights C C, where they are secured by nuts, as shown.

The rounded ends of the cross-bar G, are secured in eyes at the ends of irons E E, and the shafts H are secured to said cross-bar, by means of which the horse is attached to the rake.

The platform I is secured on the cross-pieces B B; and an arm, L, is arranged on said pieces, on the right of the centre of the platform, and extending back nearly to the rake-shaft S, on which arm is secured the sliding rock-shaft M, in the boxes b b, as shown.

A seat, K, for the driver, is secured on the platform I, by means of standard J; and a spring, P, is also secured on said platform, in such a position as to be struck by the arm O, on the sliding rock-shaft M, when said shaft is rocked over.

A foot-lever, N, and hand-lever Q, are also secured in the rock-shaft M; and the head, R, is formed at its end, the rear end r of which has a metal guard-piece secured on it.

The rake-shaft S, has the teeth T T, of wood or spring-steel, arranged in it, as shown, and is pivoted, by its rounded ends, in the slots a of the rake-standards A, shown in detached view in fig. 1.

The ratchet-wheel U, is secured on the rake-shaft S, in such a position as to come under the action of the edge r of the head R of the sliding rock-shaft M, when the same is drawn forward from the position shown in fig. 2.

From the foregoing description, the operation of my rake is readily seen.

The rake S T, being in the position shown in fig. 1, will rake up the hay, during the forward movement of the machine, and will be prevented from revolving, by the head R of the sliding rock-shaft M bearing against the upper ends of the rake-teeth T, the rock-shaft being prevented from revolving, by the pressure of the driver's foot on the foot-lever N.

When the load gathered by the rake is brought to a windrow, and is to be discharged, the driver takes his foot from the foot-lever N, and, by means of the hand-lever Q, turns the rock-shaft M, so as to bring the head, R, into an erect position, R', indicated by dotted lines in fig. 1.

This allows the rake S T to revolve, as the head, R, can then pass between the teeth T T, while the slots a a in the rake-standards A A, allow the shaft S to rise up, as it would naturally do, by the teeth T T taking a bearing on the ground.

In case the rake does not make a complete half revolution, so as to bring the ends of the teeth T T, which were uppermost during the last raking, into the proper position for raking, the sliding rock-shaft M is slid back through the boxes b b, until the head, R, is brought into the position R' shown by dotted lines in fig. 1, when the rock-shaft M is allowed to rotate, by the action of the spring P on the arm O, (which spring will be bent down by said arm during the turning of the rock-shaft by the hand-lever Q, before shown,) until the head, R, is turned into the horizontal position shown in fig. 2, when, by grasping the hand-lever Q, which will then be in an erect position, the sliding rock-shaft M can be slid forward, which will cause the guard-piece r to engage with the ratchet-wheel U, by which the rotation of the rake will be effected.

When the rake is to be turned into the position T' S T', which is the desired position for transportation, the operator seizes the hand-lever Q, and slides the rock-shaft M backward, which, as is readily seen, will turn the rake from the position T S T, to the position T' S T', or at least so far back toward the position T' S T', as that the ends of the teeth T T will be clear of the ground.

The rake is maintained in this position, by keeping the head, R, somewhat back of the position shown by full lines in fig. 1, by means of the pressure of the driver's foot on the foot-lever N; and is thrown into working-position by the action of the guard-piece r of the head, R, on the ratchet-wheel U, on the rake-shaft S, caused by a forward movement of the rock-shaft M, as hereinbefore shown.

Having thus fully described my invention, What I claim therein as new, and desire to secure by Letters Patent, is—

1. The sliding rock-shaft M, arranged in boxes b b, and provided with the head, R, hand-lever Q, and foot-lever, N, when used in combination with the revolving rake T S T, substantially as and for the purpose herein specified.

2. The spring P, when used in combination with the arm O, on the rock-shaft M, substantially as and for the purpose herein specified.

3. The combination of the sliding rock-shaft M, provided with the hand-lever Q and guard-piece r, ratchet-wheel U, and revolving hay-rake T S T, the several parts being constructed, arranged, and operating, substantially as and for the purpose herein specified.

As evidence that I claim the foregoing, I have hereunto set my hand, in the presence of two witnesses, this 19th day of April, 1869.

C. H. MOSEY.

Witnesses:
GEO. A. CLUGSTON,
HENRY C. HEDGES.